US007876941B2

United States Patent
Panin et al.

(10) Patent No.: US 7,876,941 B2
(45) Date of Patent: Jan. 25, 2011

(54) INCORPORATION OF AXIAL SYSTEM RESPONSE IN ITERATIVE RECONSTRUCTION FROM AXIALLY COMPRESSED DATA OF CYLINDRICAL SCANNER USING ON-THE-FLY COMPUTING

(75) Inventors: Vladimir Panin, Knoxville, TN (US); Frank Kehren, Knoxville, TN (US); Michael E. Casey, Louisville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 965 days.

(21) Appl. No.: 11/716,358

(22) Filed: Mar. 9, 2007

(65) Prior Publication Data
US 2008/0217540 A1 Sep. 11, 2008

(51) Int. Cl.
*G06K 9/00* (2006.01)

(52) U.S. Cl. .................. 382/128; 382/131

(58) Field of Classification Search ............ 382/128, 382/131, 276; 348/744
See application file for complete search history.

(56) References Cited

U.S. PATENT DOCUMENTS
2008/0180580 A1* 7/2008 Kadrmas .............. 348/744

OTHER PUBLICATIONS
Joseph, "An Improved Algorithm for Reprojecting Rays Through Pixel Images" Medical Imaging, IEEE Transactions on vol. 1, Issue: 3. Publication Year: 1982, pp. 192-196.*

* cited by examiner

*Primary Examiner*—John B Strege
(74) *Attorney, Agent, or Firm*—Peter L. Kendall

(57) ABSTRACT

A method and system for reconstructing PET image data from a cylindrical PET scanner by incorporation of axial system response. The method includes the steps of: assuming the decomposition of axial components into individual line-of-response (LOR) contributions, approximating each LOR spreading in image space as depth-independent, implementing each LOR response, combining the LORs to produce large span projection data, implementing the back projector as a transposed matrix, and assembling the LOR projections and spans for each azimuthal angle.

7 Claims, 6 Drawing Sheets

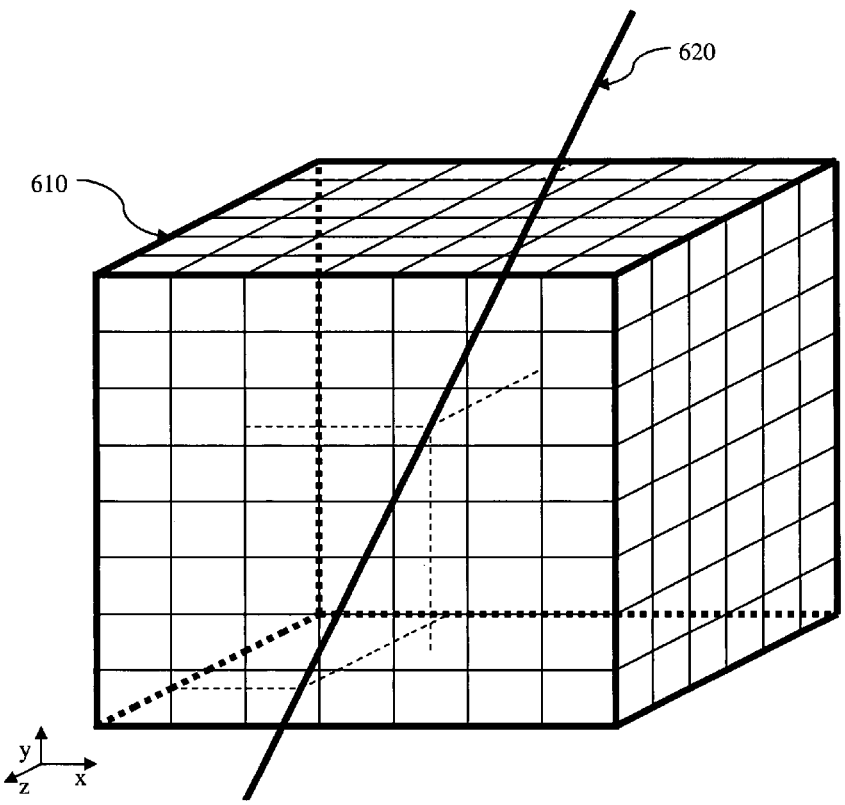
FIG. 6
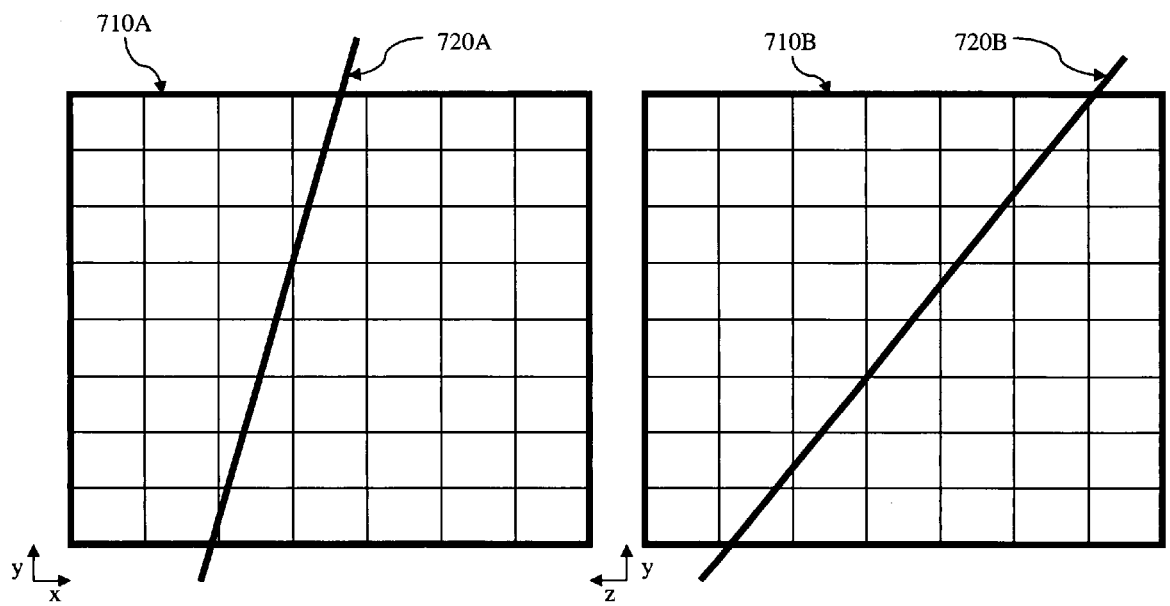
FIG. 7A
FIG. 7B

INCORPORATION OF AXIAL SYSTEM RESPONSE IN ITERATIVE RECONSTRUCTION FROM AXIALLY COMPRESSED DATA OF CYLINDRICAL SCANNER USING ON-THE-FLY COMPUTING

TECHNICAL FIELD

The current invention is in the field of medical imaging reconstruction.

BACKGROUND OF THE INVENTION

Medical imaging is one of the most useful diagnostic tools available in modern medicine. Medical imaging allows medical personnel to non-intrusively look into a living body in order to detect and assess many types of injuries, diseases, conditions, etc. Medical imaging allows doctors and technicians to more easily and correctly make a diagnosis, decide on a treatment, prescribe medication, perform surgery or other treatments, etc.

There are medical imaging processes of many types and for many different purposes, situations, or uses. They commonly share the ability to create an image of a bodily region of a patient, and can do so non-invasively. Examples of some common medical imaging types are nuclear medical (NM) imaging such as positron emission tomography (PET) and single photon emission computed tomography (SPECT), electron-beam X-ray computed tomography (CT), magnetic resonance imaging (MRI), and ultrasound (US). Using these or other imaging types and associated machines, an image or series of images may be captured. Other devices may then be used to process the image in some fashion. Finally, a doctor or technician may read the image in order to provide a diagnosis.

In PET scanning, for example, a patient is injected with tracer compounds labeled with positron-emitting radionuclides. As the radionuclides decay, they emit a positron which travels through the body a short distance until it collides with an electron. The collision causes both the positron and the electron to be annihilated. In the annihilation process, two gamma rays are emitted.

The gamma rays are emitted at substantially 180° apart from each other. The gamma rays travel out of the body and are detected by the PET scanner. If the two rays reach the scanner within a small time window (e.g. 9 ns) they are considered to be coincident and the spatial locations of each incident ray on the detectors are recorded. However, if one ray is detected without a coincident or with more than one coincident it is discarded.

The line connecting the spatial locations of the coincident rays on the pair of detectors that detected the coincident event is known as a line-of-response (LOR). Once the scan is complete, and all of the LORs are recorded, the number of counts assigned to an LOR joining a pair of crystals is proportional to a line integral of the activity along that LOR. Parallel sets of such line integrals are known as projections. Reconstruction of images from such projections is a problem to which much attention has been paid over the last 30 years, and many analytical and iterative reconstruction schemes exist. Fundamentally, it is desired to ascertain where along the LOR each event occurred, in order to reconstruct an accurate tomographic image.

Image reconstruction in fully 3D medical imaging is routinely performed using either the 3D reprojection method or a rebinning procedure in combination with 2D filtered back projection (FBP). While these algorithms can be realized with relatively low computational cost, the accuracy of the reconstructed images is limited by the approximation implicit in the line integral model on which the reconstruction formulas are based.

In contrast, statistical method can adopt arbitrarily accurate models for the mapping between source volume and sinograms. However, iterative 3D reconstruction represents a daunting computational challenge. One method proposed to overcome this challenge, is using a pre-computed system matrix with axial translation to model span blurring by projection into line-of-response space. While this method saves on computational power, it is still a time consuming task.

It is often necessary to calculate the values of line integrals through a reconstructed image of pixel values. There are many methods, e.g., Algebraic Reconstruction Techniques (ART) and Simultaneous Iterative Reconstructive Technique (SIRT), whose purpose is to obtain reconstructions under conditions in which the usual FBP algorithms work poorly.

Back projection is the formal inverse of the projection process. The process originated from work in a number of fields, including radio astronomy and electron microscopy. Simple back projection convolves any $f(x, y)$ with $1/r$, thus, the image gets severely blurred and distorted. This is the point-spread function (PSF) for a normal PET. In real systems, the taking of projections has finite resolution characterized by this PSF. To reduce the unwanted blurring effects mentioned above, one could deconvolute with a filter (filtered back projection). In deconvolution, one may cut out unwanted frequencies in Fourier space. The convolution may be equivalently performed in Fourier space where the convolution operation reduces to a simple multiplication. The reconstruction by filtered back projection is a way of filtering the simple back projection by multiplying by $v$ in Fourier space.

In a class of algorithms for calculating projects, know as the Square Pixel Method, the basic assumption is that the object considered truly consists of an array of N×N square pixels, with the image function $f(x, y)$ assumed to be constant over the domain of each pixel. The method proceeds by evaluating the length of intersection of each ray with each pixel, and multiplying the value of the pixel (S).

The major problem of this method is the unrealistic discontinuity of the model. This is especially apparent for rays whose direction is exactly horizontal or vertical, so that relatively large jumps occur in S values as the rays cross pixel-boundaries.

A second class of algorithms for calculating projections is the forward projection method. This method is literally the adjoint of the process of "back projection" of the FBP reconstruction algorithm. The major criticism of this algorithm is that the spatial resolution of the reprojection is lessened by the finite spacing between rays. Furthermore, increasing the number of pixels does not contribute to a reduction in this spacing, but does greatly increase processing time.

A third algorithm for calculating projections, developed by Peter M. Joseph and described in the paper entitled "An Improved Algorithm for Reprojecting Rays Through Pixel Images," *IEEE Transactions On Medical Imaging*, Vol. MI-1, No. 3, November 1982 (Joseph's Method), incorporated herein by reference, is similar to the structure of the pixel method. Each given ray K is specified exactly as a straight line. The basic assumption is that the image is a smooth function of x and y sampled on the grid of positions. The line integral desired is related to an integral over either x or y depending on whether the ray's direction lies closer to the x or y axis.

There remains a need in the art for improvement in image reconstruction techniques in order to increase accuracy and resolution and reduce noise.

SUMMARY OF THE INVENTION

Provided is a method for creating an incorporation of axial system response in iterative reconstruction of NM tomographic images. The method includes the steps of: assuming the decomposition of axial components into individual line-of-response (LOR) contributions, approximating each LOR spreading in image space as depth-independent, implementing each LOR response, combining the LORs to produce large span projection data, implementing the back projector as a transposed matrix, and assembling the LOR projections and spans for each azimuthal angle.

Further provided is a system for implementing the method of the present invention. The system includes a medical imaging device, a processor for receiving data from the medical imaging device, and software running on the processor. The software assumes the decomposition of axial components into individual line-of-response (LOR) contributions, approximates each LOR spreading in image space as depth-independent, implements each LOR response, combines the LORs to produce large span projection data, implements the back projector as a transposed matrix, and assembles the LOR projections and spans fore each azimuthal angle.

BRIEF DESCRIPTION OF THE DRAWINGS

The invention will now be described in greater detail in the following by way of example only and with reference to the attached drawings, in which:

FIG. 6 is a three dimensional view of an oblique LOR passing through a rectangular volume.

FIGS. 7A-B are the front and side views, respectively, of the projection of the oblique LOR in FIG. 6.

DETAILED DESCRIPTION OF THE INVENTION

As required, disclosures herein provide detailed embodiments of the present invention; however, the disclosed embodiments are merely exemplary of the invention that may be embodied in various and alternative forms. Therefore, there is no intent that specific structural and functional details should be limiting, but rather the intention is that they provide a basis for the claims and as a representative basis for teaching one skilled in the art to variously employ the present invention.

Figure 1:
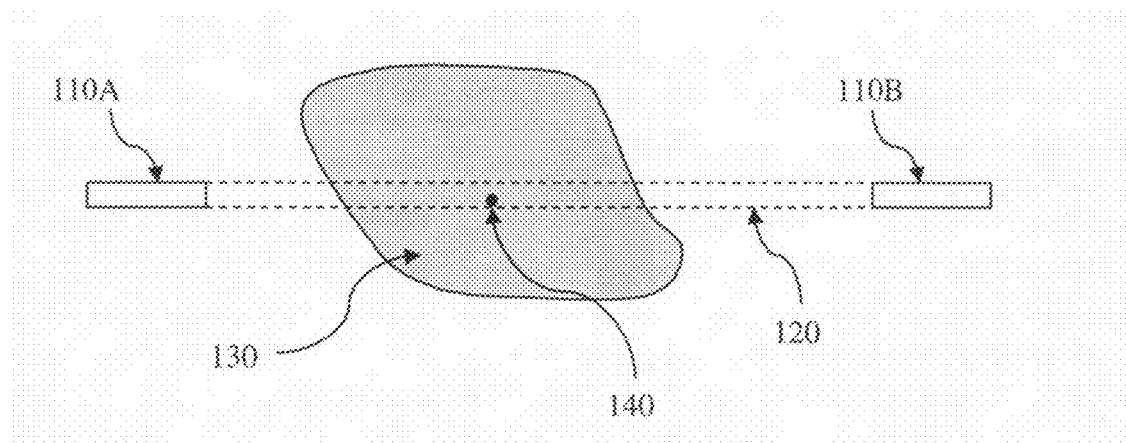
FIG. 1 is a representation of a LOR.

FIG. 1 is a representation of a LOR. An annihilation event 140 in imaged object mass 130 may emit two simultaneous gamma rays (not shown) traveling substantially 180° apart. The gamma rays may travel out of scanned mass 130 and may be detected by block detectors 110A and 110B, where the detection area of the block detector defines the minimum area or maximum resolution within which the position of an incident gamma ray may be determined. Since block detectors 110A and 110B are unable to determine precisely where the gamma rays were detected within this finite area, the LOR 120 connecting block detectors 110A and 110B may actually be a tube with its radius equal to the radius of block detectors 110A and 110B. Similar spatial resolution constraints are applicable to other types of detectors, such as photomultiplier tubes.

To minimize data storage requirements, clinical projection data are axially compressed to within a predetermined span. Accordingly, if span broadening is not modeled, a loss of resolution will result. Because it is mainly a geometrical effect, axial-blurring is depth-dependent. Such depth-dependent blurring can be pre-computed and used during reconstruction; however the memory requirements for the axial component of the data are substantial and may be cost-prohibitive.

With a cylindrical scanner, which has translational symmetry, geometrical blurring may be modeled by projecting a blurred image into LOR space, followed by axial compression. This may eliminate the storage of the axial components, but necessitates the development of special algorithms to incorporate system response. The system response modeling then will allow the use of standard reconstruction algorithms such as Joseph's Method, and a reduction of data storage requirements.

Figure 2:
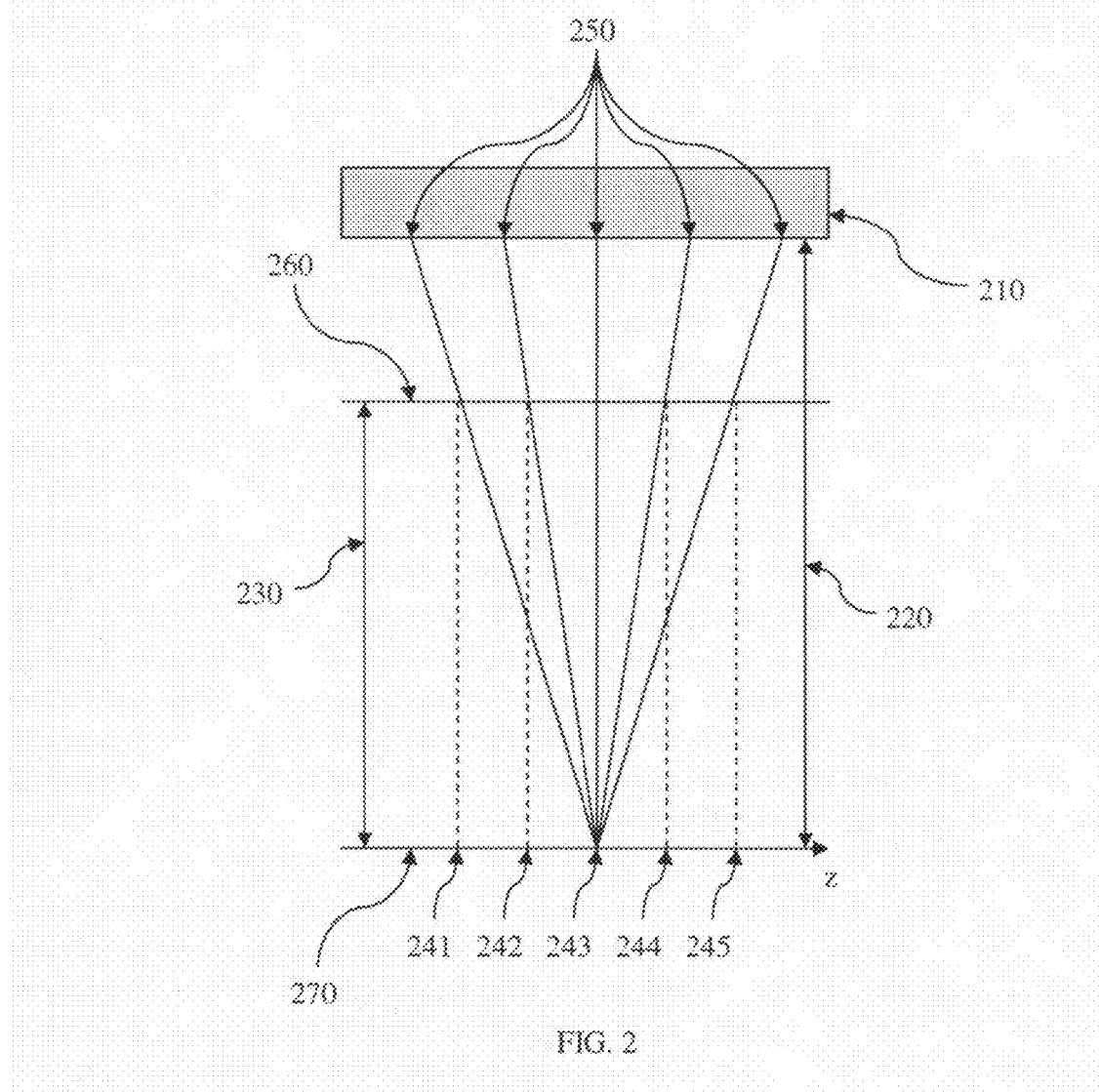
FIG. 2 is a cut away view showing multiple LORs in a cylindrical scanner.

FIG. 2 is a cut away view of a portion of a cylindrical scanner 210. Each LOR 250 detected by scanner 210 may have an axial position 241, 242, 243, 244, and 245 along the z-axis 270 that is dependent on the scanner radius 220 (i.e., r) and the depth source position 230. The scanner radius 220 is the distance between the z-axis in the center of the cylindrical scanner 210 and the surface of the cylindrical scanner. The depth source position 230 (i.e., d) is the distance between the annihilation source 260 and the z-axis 270. As apparent from FIG. 2, all LORs coincide at d=0, in other words, where the annihilation source is located on the z-axis.

Thus, each axial position 241, 242, 243, 244, and 245 may be different at a non-zero depth distance 230 and coincide at depth distance 230 equal to zero. The set of axial positions 241, 242, 243, 244, and 245 may be modeled according to the known scanner 210 geometry with some depth of interaction.

Figure 3:
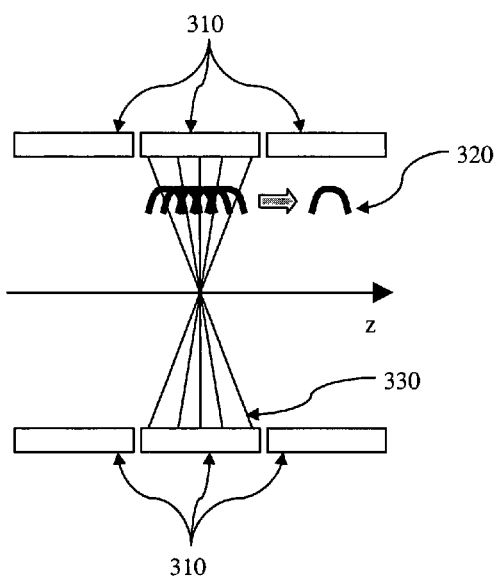
FIG. 3 is a cut away view showing Gaussian functions and LORs.

FIG. 3 is a cut away view of the system response of a cylindrical scanner 310. The response is a superposition of symmetrical Gaussian functions 320 for each LOR 330. Each Gaussian function 320 may model the physical effects of the axial component of the LOR.

When significant axial compression is used, the system response may be depth-dependent and significantly wider at larger depth distances d. Axial response has no translation symmetry since projection planes combine at a different number of LORs 330. A smaller number of LORs 330 contribute to planes when a gap crystal (i.e., crystal containing spaces or gaps between detector blocks as shown in FIG. 3) is included in the span complex. The segment border planes are also combined from a smaller number of LORs 330.

The decomposition of axial (z directional) components into individual LOR contributions may be assumed. Each LOR spreading in image space may be approximated as depth-independent. Then each LOR response may be implemented by mapping of the axially blurred image into LOR space. The LORs may then be combined to produce large span projection data. The back projector may be implemented as a transposed matrix. LOR projections and span assembling may be performed independently for each azimuthal angle. The LOR projection data may then need only small additional memory allocations corresponding to one azimuthal angle.

A fast LOR projector based on on-the-fly line integral computing may be required since significantly large sized projection data are created internally. One possible LOR projector is based on the efficient implementation of Joseph's Method. Due to axial translation symmetry, transaxial (i.e., x directional) interpolation may be used for all segment projections. In the case of cylindrical geometry, all LORs may be parallel of a given radial coordinate. Therefore, axial interpolation may be performed in a very efficient way.

Figure 4:
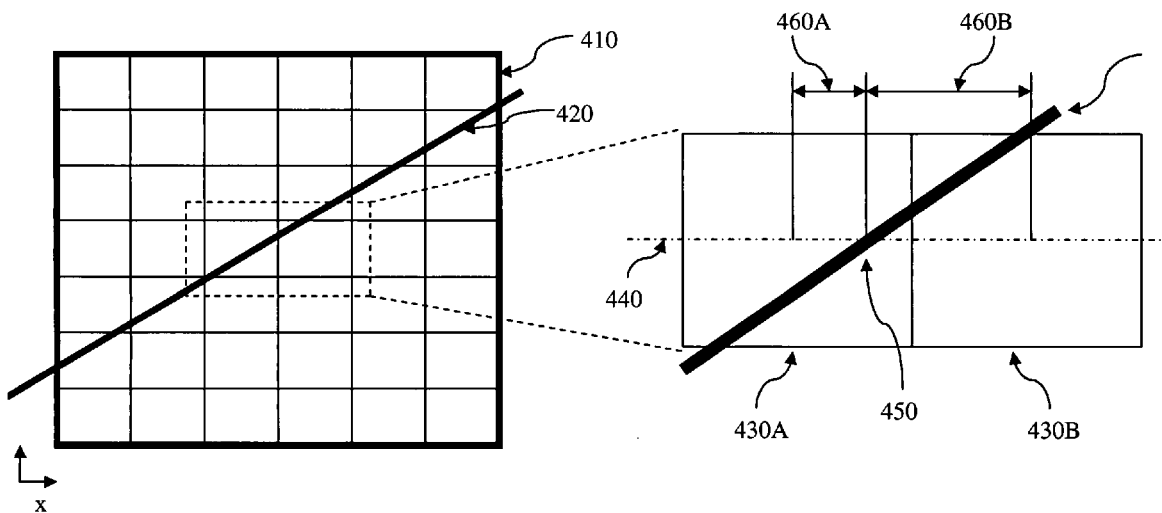
FIG. 4 is a representation of Joseph's Method in two dimensional space.

Referring to FIG. 4, in two dimensions, Joseph's Method can be summarized as follows: For any given row or line of pixels in two-dimensional detector space 410, a ray 420 gives information to the two nearest pixels 430A and 430B. The distances 460A and 460B between the centers of pixels 430A and 430B and the point 450 where ray 420 intersects the horizontal line 440 passing through the center of pixels 430A and 430B defines the interpolation coefficients.

When there is translational symmetry in the axial (z) direction, the interpolation coefficients are the same for all the rays that differ only by their axial coordinate.

Figure 5A:
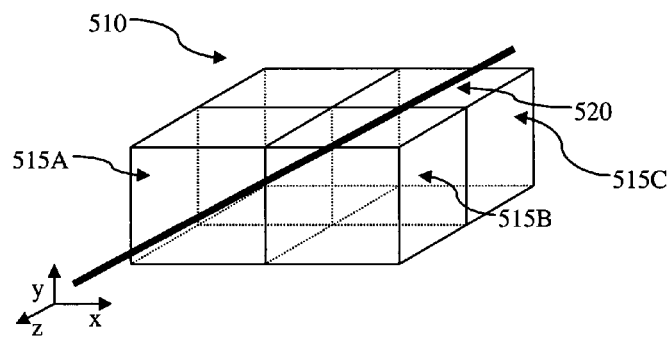
FIGS. 5A-C illustrate an oblique ray in three dimensional space, and the front and side projections of the ray respectively.
Figure 5B:
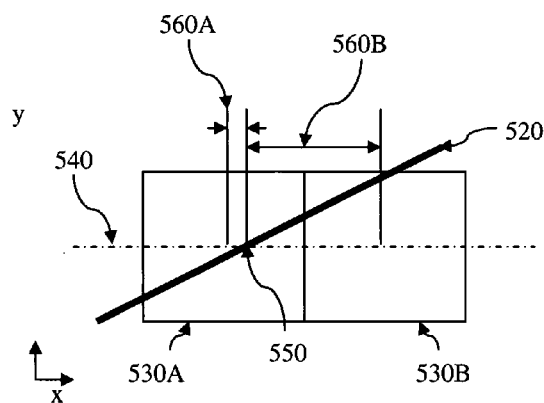
Figure 5C:
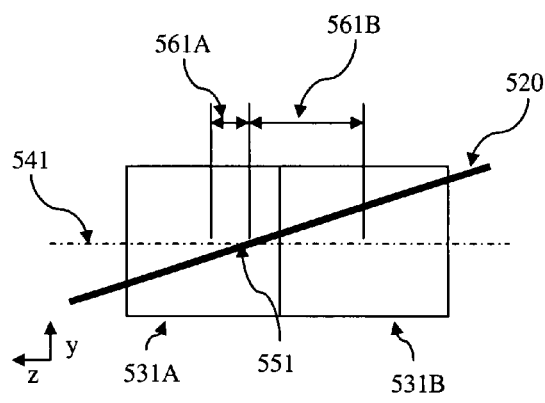

FIG. 5A is an example of an oblique segment ray 520 in three dimensional space 510. For a given image plane, oblique segment rays 520 give information to the four nearest voxels (three dimensional pixels) 515A, 515B, and 515C in the image plane: the four voxels can be broken down into four pixels: two pixels 530A and 530B in the x direction, and two pixels 531A and 531B in the axial direction (see FIGS. 5B and 5C).

In order to interpolate oblique ray 520, interpolations over the x direction and the axial direction must be made. As in the two dimensional case, the distances 560A and 560B between the centers of pixels 530A and 530B and the point 550 where the ray 520 intersects the horizontal line 540 passing through the center of pixels 530A and 530B defines the interpolation coefficients in the x direction. Likewise, the distances 561A and 561B between the centers of pixels 531A and 531B and the point 551 where the ray 520 intersects the horizontal line 541, passing through the center of pixels 531A and 531B, defines the interpolation coefficients in the axial direction.

FIG. 6 shows an example of an oblique ray 620 in rectangular volume 610. If one were to interpolate based on the above described method, the front surface (xy surface) 710A (see FIG. 7A) and side surface (yz surface) 710B (see FIG. 7B) projections of the oblique ray 620 would be necessary for each such oblique ray 620, thus creating a front ray projection 720A and a side ray projection 720B.

However, front ray projection 720A on front surface 710A may coincide with the projection of a direct (two dimensional) ray on the same plane. Therefore, the interpolation coefficients in the x direction may be the same for front ray projection 720A and the direct ray. The pixel interpolation values for the direct rays could be reused on front ray projection 720A.

Figure 8:
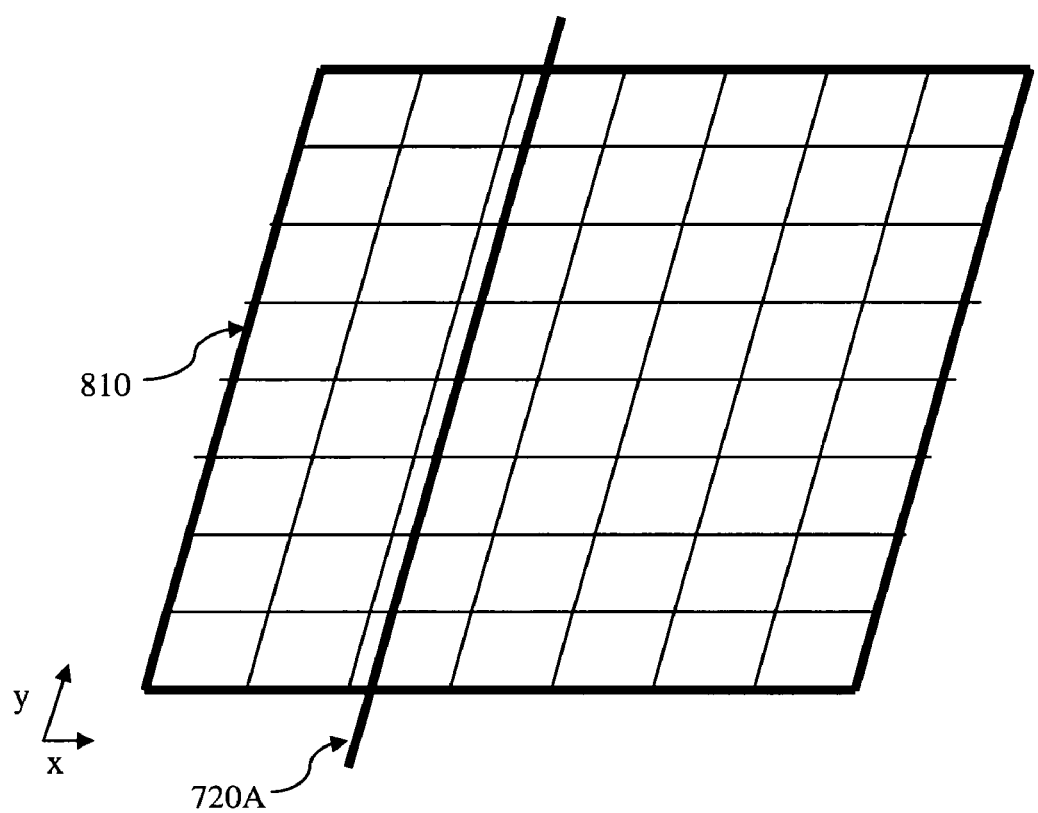
FIG. 8 is the front view of the sheared volume of FIG. 6.

An efficient way to use these interpolated pixel values over the whole image may be to compute a sheared volume 810 (see FIG. 8). In sheared volume 810, in each row from volume 610 the vertical edges of the voxels may be skewed so that they are aligned with front ray projection 720A.

By shearing volume 810 to match ray projection 720A, the two interpolations needed for oblique ray 620 may be reduced to a single interpolation of oblique ray 620 in sheared volume 810. When there is translational symmetry in the z direction, the interpolation coefficients may be the same for all the rays which differ only by their x coordinate. Therefore, only one interpolation coefficient can be used for all voxels of one axial row in the sheared volume. This coefficient may be different for each row.

Figure 9:
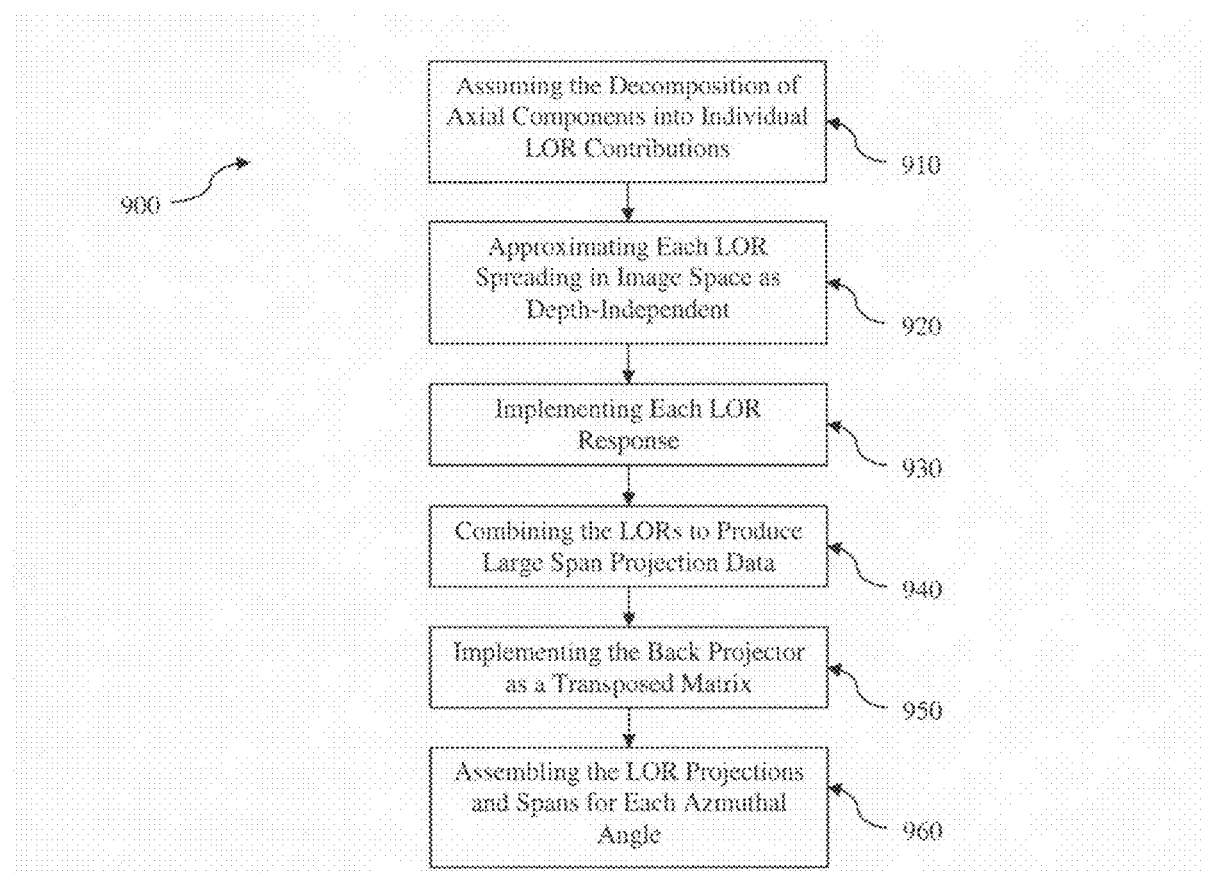
FIG. 9 is a flow chart of an embodiment of a method in accordance with the present invention.

FIG. 9 is a flowchart of an embodiment of a method 900 of the present invention. The method 900 may begin by assuming the decomposition of axial components into individual LOR contributions 910. Then each LOR spreading in image space may be approximated as depth-independent 920. Next, each LOR response may be implemented 930, by mapping an axially blurred image into LOR space. To produce large span projection data, the LORs may be combined 940. The back projector may be implemented as a transposed matrix 950. Finally, the LOR projections and spans for each azimuthal angle may be assembled 960.

Figure 10:
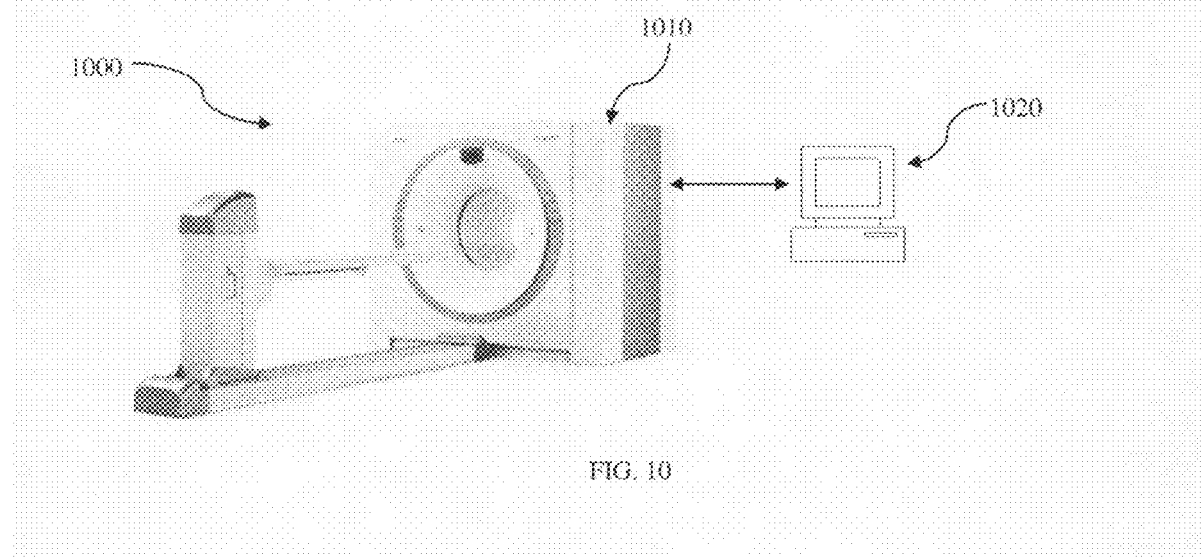
FIG. 10 is a diagram of a system for implementing the present invention.

FIG. 10 is a system 1000 for implementing the present invention. System 1000 may be comprised of a medical imaging device 1010, i.e. a PET scanner, a SPECT scanner or any other device capable of acquiring a medical image. Medical imaging device 1010 may be attached to a processor 1020 for receiving the data. Processor 1020 may have software running on it that executes a method of the present invention and outputs a fully three dimensional reconstruction of the object scanned.

What is claimed is:

1. A method for reconstructing PET projection data obtained by a cylindrical scanner having a cylindrical axis with incorporation of axial system response, comprising the steps of:
    (a) obtaining image data from said cylindrical scanner;
    (b) decomposing axial components of line-of-response (LOR) data into individual LOR response contributions;
    (c) implementing each LOR response contribution by performing, on said image data, an axially blurred image projection into LOR space independently for each azimuthal angle; and
    (d) combining the projected LORs to produce large span projection data independently for each azimuthal angle;
    wherein at least steps (c) and (d) are performed using a processor.

2. The method of claim 1, wherein step (c) is completed by a projector algorithm axially blurring the image into LOR space before the projection procedure.

3. The method of claim 2, wherein the projector is a fast LOR projector.

4. The method of claim 3, wherein the projector is based on an efficient implementation of Joseph's Method.

5. A system for reconstructing PET projection data obtained by a cylindrical seamier having a cylindrical axis with incorporation of axial system response, comprising:
    a PET imaging device;
    a processor for receiving image data that includes coincidence event data from the PET imaging device; and
    software executing on the processor, wherein the software decomposes axial components of line-of-response (LOR) data into individual LOR response contributions; implements each LOR response contribution by performing, on said image data, an axially blurred image projection into LOR space independently for each azimuthal angle, and combines the projected LORs to produce large span projection data independently for each azimuthal angle.

6. The system of claim 5, wherein the software uses a projector to axially blur the image into LOR space before the projection procedure.

7. The system of claim 6, wherein the projector is based on an efficient implementation of Joseph's Method.

* * * * *